US010228139B2

United States Patent
Cummings, III

(10) Patent No.: US 10,228,139 B2
(45) Date of Patent: Mar. 12, 2019

(54) GAS TURBINE ENGINE AND METHOD FOR OPERATING A GAS TURBINE ENGINE

(71) Applicant: Rolls-Royce Corporation, Indianapolis, IN (US)

(72) Inventor: William G. Cummings, III, Indianapolis, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 524 days.

(21) Appl. No.: 14/136,067

(22) Filed: Dec. 20, 2013

(65) Prior Publication Data

US 2014/0238037 A1  Aug. 28, 2014

Related U.S. Application Data

(60) Provisional application No. 61/769,625, filed on Feb. 26, 2013.

(51) Int. Cl.
*F23R 3/28* (2006.01)
*F23N 5/02* (2006.01)
(Continued)

(52) U.S. Cl.
CPC ............... *F23R 3/28* (2013.01); *F02C 7/228* (2013.01); *F02C 9/263* (2013.01); *F02C 9/28* (2013.01);
(Continued)

(58) Field of Classification Search
CPC .... F02C 7/228; F02C 9/26; F02C 9/28; F02C 9/32; F02C 9/263; F23K 2203/105;
(Continued)

(56) References Cited

U.S. PATENT DOCUMENTS 4,041,694 A * 8/1977 Lewis ................... F02C 9/28
431/12
5,284,020 A * 2/1994 Brocard ............... F02C 7/22
137/118.04
(Continued)

FOREIGN PATENT DOCUMENTS

| EP | 1777394 A2 | 4/2007 |
|---|---|---|
| GB | 2459777 A | 11/2009 |
| JP | S597739 A | 1/1984 |

OTHER PUBLICATIONS

Gas turbine. (Sep. 1, 2016). In Wikipedia, The Free Encyclopedia. Retrieved 16:48, Sep. 2, 2016, from https://en.wikipedia.org/w/index.php?title=Gas_turbine&oldid=737244167.*
(Continued)

*Primary Examiner* — Gerald L Sung
*Assistant Examiner* — Alain Chau
(74) *Attorney, Agent, or Firm* — Fishman Stewart PLLC

(57) ABSTRACT

A method for operating a gas turbine engine during flight operation of the gas turbine engine in an aircraft may include measuring a gas temperature downstream of the combustor using a plurality of temperature measurement devices circumferentially disposed about an engine centerline and varying the output of at least one fuel injector in a first direction and the output of at least another fuel injector in a second direction, while maintaining a thrust output of the gas turbine engine during the flight operation. A gas turbine engine may include temperature measurement devices circumferentially disposed about an engine centerline and a system configured for varying the output of at least one fuel injector in a first direction and the output of at least another fuel injector in a second direction, while maintaining a power output of the gas turbine engine. Other embodiments
(Continued)

include apparatuses, systems, devices, hardware, methods, and combinations for gas turbine engines.

14 Claims, 2 Drawing Sheets

(51) Int. Cl.
    *F02C 9/32*                  (2006.01)
    *F02C 9/28*                  (2006.01)
    *F02C 7/228*               (2006.01)
    *F02C 9/26*                  (2006.01)

(52) U.S. Cl.
    CPC ............... *F02C 9/32* (2013.01); *F23N 5/022* (2013.01); *F05D 2270/112* (2013.01); *F05D 2270/303* (2013.01)

(58) Field of Classification Search
    CPC ........ F23N 2041/20; F23N 5/24; F23N 5/003; F23N 5/022; F05D 2270/3032; F23R 3/28
    USPC .............................................. 60/773, 39.281
    See application file for complete search history.

(56) References Cited

U.S. PATENT DOCUMENTS

| | | |
|---|---|---|
| 5,319,931 A | 6/1994 | Beebe et al. |
| 5,365,732 A | 11/1994 | Correa |
| 5,661,969 A | 9/1997 | Beebe et al. |
| 5,761,895 A * | 6/1998 | Chu .......................... F02C 9/28 60/39.281 |
| 6,810,655 B2 | 11/2004 | Davis, Jr. et al. |
| 6,883,329 B1 | 4/2005 | Martling |
| 7,024,862 B2 * | 4/2006 | Miyake ................... F23N 1/022 60/773 |
| 7,188,465 B2 | 3/2007 | Kothnur et al. |
| 7,260,937 B2 | 8/2007 | Kothnur et al. |
| 7,269,939 B2 | 9/2007 | Kothnur et al. |
| 7,320,213 B2 | 1/2008 | Shah et al. |
| 7,484,352 B2 * | 2/2009 | Flohr ........................ F23R 3/34 60/39.281 |
| 7,707,814 B2 | 5/2010 | Sonoda et al. |
| 7,739,873 B2 | 6/2010 | Venkataramani et al. |
| 7,775,052 B2 | 8/2010 | Cornwell et al. |
| 7,805,922 B2 | 10/2010 | Bland |
| 7,891,192 B2 | 2/2011 | Myers et al. |
| 8,200,410 B2 * | 6/2012 | Williams ................ F23N 1/002 422/220 |
| 2002/0178730 A1 * | 12/2002 | Ganz ..................... F01D 17/085 60/773 |
| 2003/0144787 A1 * | 7/2003 | Davis, Jr. ................ F02C 7/228 701/100 |
| 2004/0255594 A1 * | 12/2004 | Baino ...................... F02C 9/26 60/773 |
| 2005/0097895 A1 * | 5/2005 | Kothnur .................. F02C 7/222 60/776 |
| 2006/0107666 A1 * | 5/2006 | Kothnur .................. F02C 7/222 60/773 |
| 2006/0219968 A1 | 10/2006 | Jansen |
| 2007/0214795 A1 * | 9/2007 | Cooker ..................... F02K 1/06 60/772 |
| 2007/0256425 A1 * | 11/2007 | Brautsch ................. F02C 6/003 60/774 |
| 2009/0241506 A1 * | 10/2009 | Nilsson ..................... F02C 9/28 60/39.24 |
| 2010/0115955 A1 * | 5/2010 | Goeke ..................... F02C 7/228 60/740 |
| 2010/0287943 A1 * | 11/2010 | McMahan ............. F01D 25/002 60/772 |
| 2010/0300108 A1 * | 12/2010 | Demougeot ............ F02C 7/228 60/773 |

OTHER PUBLICATIONS

Brayton cycle. (Aug. 29, 2016). In Wikipedia, The Free Encyclopedia. Retrieved 16:45, Sep. 2, 2016, from https://en.wikipedia.org/w/index.php?title=Brayton_cycle&oldid=736767746.*
English Abstract for JPS597739A.
International Search Report for PCT/US2013/068693 dated Aug. 14, 2014.

* cited by examiner

GAS TURBINE ENGINE AND METHOD FOR OPERATING A GAS TURBINE ENGINE

CROSS-REFERENCE TO RELATED APPLICATIONS

This application claims priority to U.S. Provisional Patent Application No. 61/769,625 filed Feb. 26, 2013, the contents of which are hereby incorporated in their entirety.

FIELD OF THE DISCLOSURE

The present disclosure relates to gas turbine engines, and more particularly, to gas turbine engines and methods for operating gas turbine engines.

BACKGROUND

Controlling the flow of fuel in a gas turbine engine remains an area of interest. Some existing systems have various shortcomings, drawbacks, and disadvantages relative to certain applications. Accordingly, there remains a need for further contributions in this area of technology.

SUMMARY

One embodiment of the present disclosure is a unique method for operating a gas turbine engine during flight operation of the gas turbine engine in an aircraft. One embodiment of the present disclosure is a unique gas turbine engine. Other embodiments include apparatuses, systems, devices, hardware, methods, and combinations for gas turbine engines. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
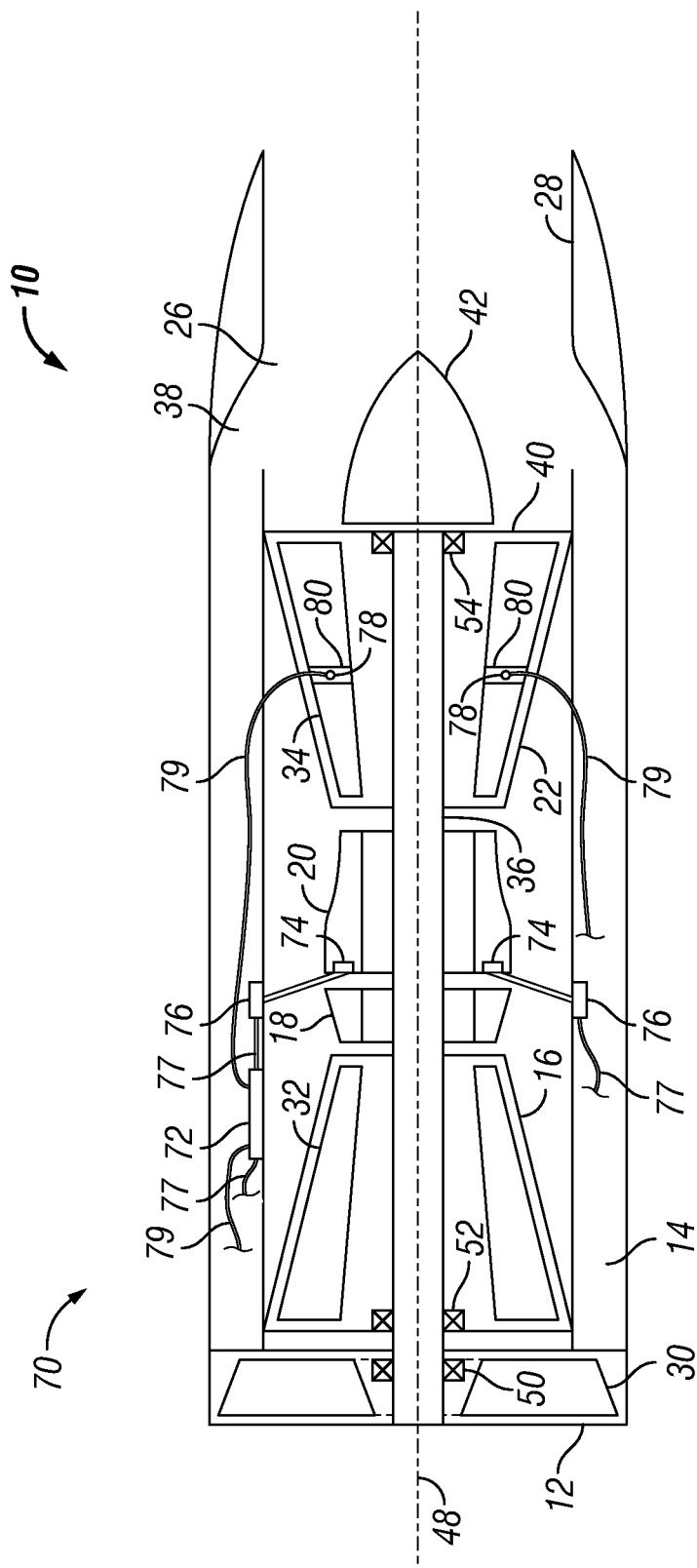
FIG. 1 schematically illustrates some aspects of a non-limiting example of a gas turbine engine in accordance with an embodiment of the present disclosure.

For purposes of promoting an understanding of the principles of the disclosure, reference will now be made to the embodiments illustrated in the drawings, and specific language will be used to describe the same. It will nonetheless be understood that no limitation of the scope of the disclosure is intended by the illustration and description of certain embodiments of the disclosure. In addition, any alterations and/or modifications of the illustrated and/or described embodiment(s) are contemplated as being within the scope of the present disclosure. Further, any other applications of the principles of the disclosure, as illustrated and/or described herein, as would normally occur to one skilled in the art to which the disclosure pertains, are contemplated as being within the scope of the present disclosure.

Referring to the drawings, and in particular FIG. 1, some aspects of a non-limiting example of a gas turbine engine 10 in accordance with an embodiment of the present disclosure is schematically depicted. In one form, gas turbine engine 10 is an aircraft propulsion power plant installed in an aircraft (not shown), and provides power to the aircraft during ground operations, e.g., taxi, and during flight operations. In one form, gas turbine engine 10 is a multi-spool turbofan engine. In other embodiments, gas turbine engine 10 may take other forms, and may be, for example, a turboshaft engine, a turbojet engine, a turboprop engine, or a combined cycle engine having a single spool or multiple spools. In various embodiments, gas turbine engine 10 may be a land-based engine, e.g., for electrical power generation, pumping or other purposes, a marine engine, or any other type of gas turbine engine.

As a turbofan engine, gas turbine engine 10 includes a fan system 12, a bypass duct 14, a compressor 16, a diffuser 18, a combustor 20, a turbine 22, a discharge duct 26 and a nozzle system 28. Bypass duct 14 and compressor 16 are in fluid communication with fan system 12. Diffuser 18 is in fluid communication with compressor 16. Combustor 20 is fluidly disposed between compressor 16 and turbine 22. In one form, combustor 20 includes a combustion liner (not shown) that contains a continuous combustion process. In one form, combustor 20 is an annular combustor. In other embodiments, combustor 20 may be in the form of one or more can combustors. In still other embodiments, combustor 20 may take still other forms, and may be, for example and without limitation, a wave rotor combustion system, a rotary valve combustion system or a slinger combustion system, and may employ deflagration and/or detonation combustion processes.

Fan system 12 includes a fan rotor system 30. In various embodiments, fan rotor system 30 includes one or more rotors (not shown) that are powered by turbine 22. Bypass duct 14 is operative to transmit a bypass flow generated by fan system 12 to nozzle 28. Compressor 16 includes a compressor rotor system 32. In various embodiments, compressor rotor system 32 includes one or more rotors (not shown) that are powered by turbine 22. Each compressor rotor includes a plurality of rows of compressor blades (not shown) that are alternatingly interspersed with rows of compressor vanes (not shown). Turbine 22 includes a turbine rotor system 34. In various embodiments, turbine rotor system 34 includes one or more rotors (not shown) operative to drive fan rotor system 30 and compressor rotor system 32. Each turbine rotor includes a plurality of turbine blades (not shown) that are alternatingly interspersed with rows of turbine vanes (not shown).

Turbine rotor system 34 is drivingly coupled to compressor rotor system 32 and fan rotor system 30 via a shafting system 36. In various embodiments, shafting system 36 includes a plurality of shafts that may rotate at the same or different speeds and directions. In some embodiments, only a single shaft may be employed. Turbine 22 is operative to discharge an engine 10 core flow to nozzle 28. In one form, fan rotor system 30, compressor rotor system 32, turbine rotor system 34 and shafting system 36 rotate about an engine centerline 48. In other embodiments, all or parts of fan rotor system 30, compressor rotor system 32, turbine rotor system 34 and shafting system 36 may rotate about one or more other axes of rotation in addition to or in place of engine centerline 48. Fan rotor system 30 loads, compressor rotor system 32 loads, turbine rotor system 34 loads and shafting system 36 loads are supported and reacted by a plurality of bearing systems, e.g., illustrated as bearing systems 50, 52 and 54. The locations and numbers of bearing systems may vary with the needs of the application—bearing systems 50, 52 and 54 are presented for illustrative purposes only.

Discharge duct 26 extends between a discharge portion 40 of turbine 22 and engine nozzle 28. Discharge duct 26 is operative to direct bypass flow and core flow from a bypass duct discharge portion 38 and turbine discharge portion 40, respectively, into nozzle system 28. In some embodiments, discharge duct 26 may be considered a part of nozzle 28. Nozzle 28 is in fluid communication with fan system 12 and turbine 22. Nozzle 28 is operative to receive the bypass flow from fan system 12 via bypass duct 14, and to receive the core flow from turbine 22, and to discharge both as an engine exhaust flow, e.g., a thrust-producing flow. In other embodiments, other nozzle arrangements may be employed, including separate nozzles for each of the core flow and the bypass flow.

During the operation of gas turbine engine 10, air is drawn into the inlet of fan 12 and pressurized by fan 12. Some of the air pressurized by fan 12 is directed into compressor 16 as core flow, and some of the pressurized air is directed into bypass duct 14 as bypass flow, and is discharged into nozzle 28 via discharge duct 26. Compressor 16 further pressurizes the portion of the air received therein from fan 12, which is then discharged into diffuser 18. Diffuser 18 reduces the velocity of the pressurized air, and directs the diffused core airflow into combustor 20. Fuel is mixed with the pressurized air in combustor 20, which is then combusted. The hot gases exiting combustor 20 are directed into turbine 22, which extracts energy in the form of mechanical shaft power sufficient to drive fan system 12 and compressor 16 via shafting system 36. The core flow exiting turbine 22 is directed along an engine tail cone 42 and into discharge duct 26, along with the bypass flow from bypass duct 14. Discharge duct 26 is configured to receive the bypass flow and the core flow, and to discharge both as an engine exhaust flow, e.g., for providing thrust, such as for aircraft propulsion.

Fuel is supplied during the operation of engine 10 via a system 70. System 70 is configured for providing fuel to combustor 20. System 70 includes a controller 72; a plurality of fuel injectors 74 which may also be referred to as fuel nozzles 74; a plurality of controllers 76; and a plurality of temperature measurement devices 78. In one form, controller 72 is an engine controller, such as a full authority digital engine controller (FADEC), although controller 72 may take suitable form, and may or may not be an engine controller, depending upon the embodiment. Controller 72 is configured to execute program instructions to control the flow of fuel into combustor 20 via fuel injectors 74, including balancing the fuel flow delivered by each of the fuel injectors 74 in order to provide a uniform measured gas temperature as measured between each of the temperature measurement devices 78.

As an engine controller, controller 72 performs various functions in addition to controlling the flow of fuel into combustor 20. However, in some embodiments, controller 72 may be a dedicated controller for controlling the flow into combustor 20, including balancing the fuel flow delivered by each of the fuel injectors 74 in order to provide a uniform measured gas temperature as between each of the temperature measurement devices 78, or may perform some functions in addition to so controlling the flow into combustor 20. In one form, controller 72 is microprocessor based and the program instructions are in the form of software stored in a memory (not shown). However, it is alternatively contemplated that the controller and program instructions may be in the form of any combination of software, firmware and hardware, including state machines, and may reflect the output of discreet devices and/or integrated circuits, which may be co-located at a particular location or distributed across more than one location, including any digital and/or analog devices configured to achieve the same or similar results as a processor-based controller executing software or firmware based instructions.

Fuel injectors 74 are configured and operative receive pressurized fuel from a fuel line system, such as a fuel manifold system, and to inject the fuel into combustor 20. In one form, fuel injectors 74 are circumferentially disposed about engine centerline 48, e.g., equally spaced from one another circumferentially. In other embodiments, fuel injectors 74 may be arranged in any manner suitable for the particular combustor 20. The output of each of the fuel injectors 74 is independently variable, and may be varied, for example, to balance the fuel flow delivered by each of the fuel injectors 74 in order to provide a uniform measured gas temperature as between each of the temperature measurement devices 78.

In one form, each controller 76 is communicatively coupled to a corresponding fuel injector 74, and to controller 72 via a communications link 77. Hence, in one form, the number of controllers 76 corresponds to the number of fuel injectors 74. In various embodiments, communications link 77 may be a wired, wireless and/or optical link configured to carry analog and/or digital data. Although the present embodiment contemplates a controller 76 corresponding to each fuel injector 74, in other embodiments, each controller 76 may be associated with or correspond to and be communicatively coupled to more than one fuel injector 76. Each controller 76 is configured to and operative to control the flow of fuel discharged by its corresponding fuel injector 74. In one form, each controller 76 is configured to and operative to control the flow of fuel discharged by its corresponding fuel injector 74 under the direction of controller 72. Other embodiments may not employ controller 72 for controlling controllers 76, but rather, in some embodiments, controllers 76 may form a self-governing system configured to and operative to control the flow of fuel discharged by individual fuel injectors 74. Each controller 76 may take a form similar to that described above with respect to controller 72, or may take any other suitable form.

Temperature measurement devices 78 are communicatively coupled to controller 72 via a communications link 79. In various embodiments, communications link 79 may be a wired, wireless and/or optical link configured to carry analog and/or digital data. Temperature measurement devices 78 are configured to and operative to supply measured gas temperature data to the controller 72. Measured gas temperature is the temperature of the gases flowing past of temperature measurement devices 78, as measured by temperature measurement devices 78. In one form, temperature measurement devices 78 are thermocouples. In other embodiments, other temperature measurement devices may be employed in addition to or in place of thermocouples.

In one form, temperature measurement devices 78 are circumferentially disposed about engine centerline 48, e.g., equally spaced from one another circumferentially, and are positioned downstream of combustor 20. In other embodiments, temperature measurement devices 78 may be arranged in any suitable manner. In one form, temperature measurement devices 78 are disposed within the core stream hot gas path downstream of combustor 20. In one form, temperature measurement devices 78 are disposed within turbine vanes (or nozzles) 80, which may be any desirable turbine stage, e.g., first stage vanes, second stage vanes, third stage vanes, etc., depending upon the needs of the particular application. In other embodiments, temperature measurement devices 78 may be disposed on an outside portion, e.g., a leading edge of a turbine vane, or may be positioned on or within a strut, or may be positioned at any desirable location, alone or in conjunction with another structure.

Figure 2:
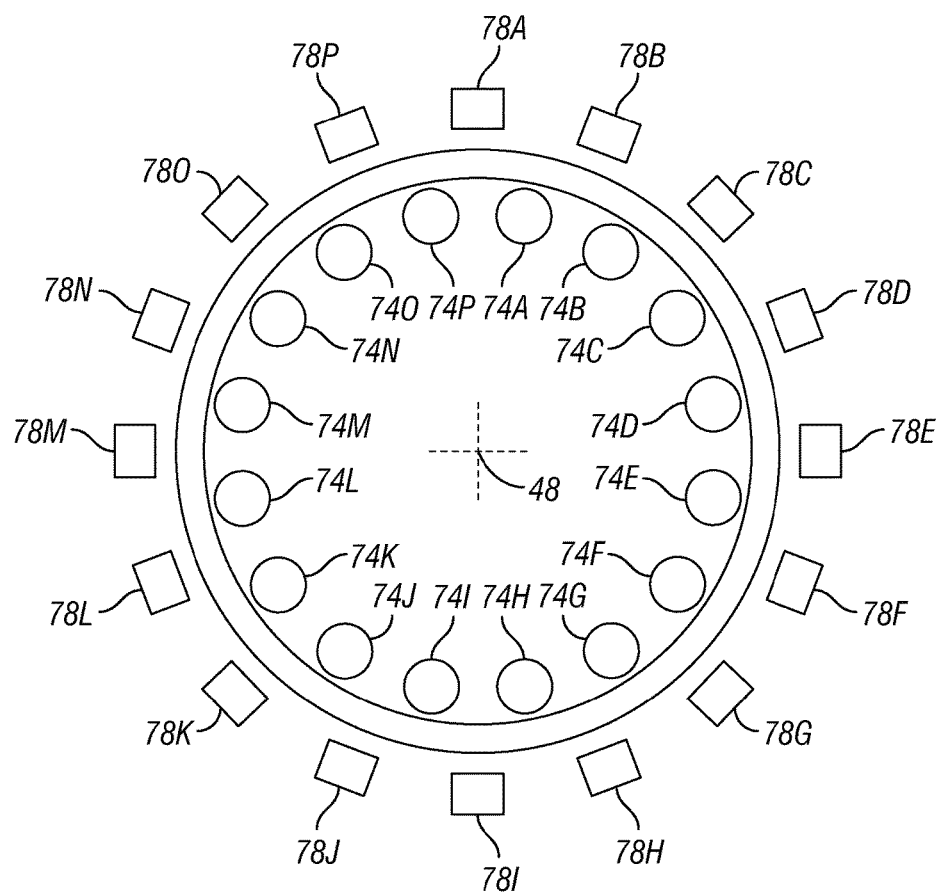
FIG. 2 schematically illustrates some aspects of a non-limiting example of an orientation of fuel injectors and temperature measurement devices in accordance with an embodiment of the present disclosure.

Referring now to FIG. 2 in conjunction with FIG. 1, in a non-limiting example, system 70 includes 16 fuel injectors 74, designated as fuel injectors 74A-74P, and includes 16 temperature measurement devices 78, designated as temperature measurement devices 78A-78P, which are disposed downstream of fuel injectors 74A-74P and downstream of combustor 20. In the depiction of FIG. 2, engine centerline 48 is depicted as crosshairs, indicating that engine centerline 48 is perpendicular to the plane of FIG. 2. The angular relationship between fuel injectors 74 and temperature measurement devices 78 may vary with the needs of the application. In addition, spacing, e.g., circumferential spacing and/or radial spacing, between fuel injectors 74 themselves, between temperature measurement devices 78 themselves and between fuel injectors 74 and temperature measurement devices 78 may vary with the needs of the application.

System 70 is configured for providing a fuel flow into combustor 20 via the plurality of fuel injectors 74 for combusting the fuel in combustor 20; measuring a gas temperature downstream of combustor 20 using the plurality of temperature measurement devices 78; and varying the output of at least one of the fuel injectors 74 in a first direction (i.e., an increase or decrease in output) and the output of at least another of the fuel injectors 74 in a second direction (a decrease or an increase—the second direction being opposite of the first direction), while maintaining a power output of gas turbine engine 10 the same as it was prior to the varying. In some embodiments, the output of a single fuel injector 74 is varied in the first direction, and the output of the balance of the fuel injectors 74 are varied in the second or opposite direction. The varying of the output of the fuel injectors identifies which of the temperature measurement devices 78 is affected or impacted by the particular at least one of the fuel injectors 74 (a particular fuel injector 74 or a group of fuel injectors 74).

By identifying which temperature measurement device(s) 78 is/are impacted by the output of a particular fuel injector 74 (or group of fuel injectors in some embodiments), it is known, e.g., by controller 72, that the temperature data supplied by those impacted temperature measurement devices is pertinent to the output of the particular fuel injector 74 (or group of fuel injectors 74), and hence is used, e.g., by controller 72, to trim or adjust the output of the particular fuel injector 74 (or group of fuel injectors 74). By repeating the process of varying the output of each fuel injector 74 in the first direction and the output of at least another fuel injector 74 (e.g., the balance of fuel injectors 74) in the second or opposite direction, it becomes known, e.g., within controller 72), which temperature measurement device(s) 78 is/are impacted by the fuel output of which fuel injector 74 (or group of fuel injectors).

Thus, by identifying which temperature measurement device(s) 78 is impacted by the fuel output of which fuel injector 74, the fuel flow output of each of the fuel injectors 74 may be trimmed based on temperature data provided from the impacted temperature measurement device(s) 78 to yield a balanced (or equalized) fuel flow as between the fuel injectors 74 in accordance with embodiments of the present disclosure, yielding a uniform measured gas temperature as measured between the plurality of temperature measurement devices. The amount that the fuel flow is varied in the second direction for the at least another fuel injector 74 (e.g., the balance of the fuel injectors) is determined to be sufficient to compensate for the for the amount that the fuel flow is varied in the first direction for the at least one of the fuel injectors 74, such that the total fuel flow and hence the output of engine 10 remains the same, which is particularly useful during flight operations of an engine 10 installed in an aircraft, whereby the fuel injectors 74 may be trimmed during flight operations, which may yield an improvement in turbine blade life in some embodiments, without adversely affecting engine thrust output. Similar benefits would be obtained by land-based engine, wherein the fuel injectors may be trimmed during operation of the engine, but without adversely affecting, for example, power generation, pumping, etc.

In one non-limiting example, when a more uniform temperature field at the combustor 20 exit plane is achieved, a longer life for turbine components may result. The fuel flow rate for each fuel injector 74 is determined and updated, e.g., each flight, by a fuel flow variation technique, such as that mentioned above, a non-limiting example of which is herein described. In some embodiments, the flow variations are performed during a phase of the flight when the overall fuel flow is held constant and when the turbine temperatures are moderate enough to be able to withstand modest fuel flow changes without significantly impacting turbine life, such as during the initial cruise portion of a flight. In other embodiments, the fuel flow variations may be performed under other conditions, for both flight engines and non-flight engines. The fuel flow variation and learned temperature impacts would be used to trim flows to individual injectors so as to minimize temperature variability at the turbine inlet. The trimmed fuel flows would then be applied at all flight conditions, including high-temperature conditions such as takeoff, thereby extending the life of the turbine in some embodiments.

In the example illustrated in FIG. 2, the control logic, e.g., program instructions of controller 72, would initially establish uniform fuel flows to all fuel injectors 74 via a signal, e.g., an electronic signal, sent to each controller 76. Although the intent may be to flow the same amount of fuel out of each injector, this may not happen for one of a variety of reasons, including, for example and without limitation, manufacturing tolerances in fuel injectors 74. Then, at any time the overall fuel flow is held constant, maintaining a constant output of engine 10, e.g., a constant thrust output and/or other form of power output, such as a constant shaft power output, a fuel flow dithering technique is employed to identify which temperature measurement devices 78 are affected by which fuel injectors 74. Data pertaining to the identification of which temperature measurement device(s) 78 are affected or impacted by which fuel injector(s) 74 is stored in a controller, e.g., controller 72, or alternatively one or more controllers 76, for subsequent use in balancing the fuel flow output of the fuel injectors 74 by trimming one or more of the fuel injectors 74 to yield a uniform measured gas temperature as measured between temperature measurement devices 78, such that the temperature measurement devices 78 each indicate approximately the same temperature. By use of the term, "approximately," it will be understood that an acceptable tolerance may be established, allowing some acceptable deviation from perfect agreement as between each of the temperature measurement devices 78.

For example and without limitation, a fuel flow dithering technique may include reducing the output of a fuel injector 74, e.g., fuel injector 74A, by 5% for a brief period, e.g., 10 seconds, while at the same time increasing the output of injectors 74B-74P by 0.33% for the same amount of time, to maintain the same fuel output (and hence, the same thrust or power output of engine 10) as prior to the initiation of the dithering technique, (in some embodiments, a plurality of fuel injectors 74 may be adjusted in one direction, and the balance of the fuel injectors adjusted in the other direction). The output of temperature measurement devices 78 is then read, e.g., by controller 72, which determines which of the temperature measurement devices are impacted by the reduction in fuel flow output from fuel injector 74A, e.g., based on a decrease in measured gas temperature, since those temperature measurement devices 78 impacted by the particular fuel injector will be exposed to a lower-temperature gas stream than those temperature measurement devices 78 not impacted by the reduction in fuel flow output from fuel injector 74A. The impacted temperature measurement devices 78 are not necessarily those that are circumferentially aligned with and directly downstream of the particular fuel injector 74, e.g., 74A. For example, for combustors with high dome swirl, e.g., often employed in modern military and lean-burn civil aircraft engines, the impacted temperature measurements devices may not only be the in-line temperature measurement devices 78A and 78B, but may also be temperature measurement devices 78O, 78P, 78C and 78D.

Once it is determined which temperature measurement devices 78 are impacted, for the first fuel injector 74A, the process is repeated, e.g., wherein the fuel flow output of the circumferentially adjacent fuel injector 74 is reduced by 5%, and the fuel flow output of the balance of the fuel injectors 74 is increased by 0.33%, and the determination which temperature measurement devices 78 are impacted is made. In one form, the process is repeated, sequentially, e.g., from fuel injector 74A to fuel injector 74B, to fuel injector 74C, etc. to fuel injector 74P, e.g., in the circumferential direction, until each of the fuel injectors 74A-74P have been subjected to the 5% reduction in fuel flow output (and the 0.33% increase in fuel flow output). In other embodiments, the dithering process may take place using patterns other than circumferentially sequential. Once the dithering process is completed, controller 72 will have data as to which of the temperature measurement devices 78 are impacted by which of the fuel injectors 74. This data is used to trim the fuel flow output of one or more fuel injectors 74 based on the output of the known impacted temperature measurement devices 78. The trimming is performed by controller 72 sending a signal to the controller(s) 76 associated with the fuel injector(s) 74 to be trimmed, in response to which the requisite controller(s) 76 adjust the output of the corresponding fuel injector(s) 74. The output of the fuel injectors 74 is trimmed to achieve a uniform temperature field as measured by temperature measurement devices 78, which yields a balanced fuel flow as between fuel injectors 74. It will be understood that the 5% reduction and 0.33% increase described herein is a non-limiting example, and that other values may be employed in accordance with the needs of the particular application. It will also be understood that instead of a 5% reduction and 0.33% increase, as described above, a 5% increase and 0.33% reduction may be employed or any other values suitable for the particular application.

While the disclosure has been described in connection with what is presently considered to be the most practical and preferred embodiment, it is to be understood that the disclosure is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the disclosure, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method for operating a gas turbine engine during flight operation of the gas turbine engine in an aircraft, comprising:
    providing a fuel flow into a combustor via a plurality of fuel injectors circumferentially disposed about an engine centerline, and combusting fuel in the combustor;
    measuring a gas temperature downstream of the combustor using a plurality of temperature measurement devices that are equal in quantity to the plurality of fuel injectors and circumferentially disposed about the engine centerline such that each of the plurality of temperature measurement devices is disposed circumferentially between respective circumferentially adjacent pairs of the plurality of fuel injectors;
    varying, by way of a full authority digital engine controller (FADEC), a first output of an individual one of the plurality of fuel injectors in a first direction by a first amount of fuel flow for a predetermined time period and a second output of other ones of the plurality of fuel injectors in a second direction that is opposite the first direction by a second amount of fuel flow for the predetermined time period, such that a thrust output of the gas turbine engine during the flight operation remains the same as prior to the varying; and
    determining which of the plurality of temperature measurement devices is impacted by the varying the first output of the individual one of the plurality of fuel injectors in the first direction by determining which of the plurality of temperature measurement devices experiences a change in a gas temperature measurement following the varying, and
    trimming the second output of at least one of the other ones of the plurality of fuel injectors based on the gas temperature measurement from the plurality of temperature measurement devices that are impacted by the varying of the first output of the individual one of the plurality of fuel injectors in the first direction to yield a uniform measured gas temperature between the plurality of temperature measurement devices.

2. The method of claim 1, further comprising at least one of:
    providing the plurality of temperature measurement devices arranged in a circumferentially staggered relationship to the plurality of fuel injectors;

providing the plurality of temperature measurement devices on a leading edge of at least one of the turbine vane; and providing second stage vanes and third stage vanes, and the plurality of temperature measurement devices on at least one of the second stage vanes and the third stage vanes.

3. The method of claim 1, wherein the providing of the fuel flow into the combustor is providing the fuel flow into an annular combustor.

4. The method of claim 1, wherein the varying of the first output of the individual one of the plurality of fuel injectors in the first direction is performed at the same time as the varying of the second output of the other ones of the plurality of fuel injectors in the second direction is performed such that a total fuel output to the plurality of fuel injectors remains constant during the varying.

5. The method of claim 4, wherein the varying of the second output of the other ones of the plurality of fuel injectors is performed sequentially in a circumferential direction.

6. The method of claim 1, further comprising trimming the second output of the at least one of the other ones of the plurality of fuel injectors by operating a controller associated with the individual one of the plurality of fuel injectors.

7. A gas turbine engine, comprising:
a compressor;
a combustor in fluid communication with the compressor;
a turbine in fluid communication with the combustor; and
a system for providing fuel flow to the combustor, the system including a first controller;
a plurality of fuel injectors circumferentially disposed about an engine centerline and operative to discharge fuel into the combustor;
a plurality of second controllers, each second controller corresponding to at least one fuel injector of the plurality of fuel injectors, wherein each second controller is communicatively coupled to the first controller and is configured to control a flow of fuel discharged by the corresponding at least one fuel injector under the direction of the first controller; and
a plurality of temperature measurement devices that are equal in quantity to the plurality of fuel injectors and circumferentially disposed about the engine centerline downstream of the combustor, and each of the plurality of temperature measurement devices is disposed circumferentially between respective circumferentially adjacent pairs of the plurality of fuel injectors, wherein the temperature measurement devices are communicatively coupled to the first controller and configured to supply measured gas temperature data to the first controller,
wherein the the first controller is configured to
control a fuel flow into the combustor via the plurality of fuel injectors for combusting the fuel in the combustor by measuring a gas temperature downstream of the combustor using the plurality of temperature measurement devices, and varying an first output of an individual one of the plurality of fuel injectors in a first direction by a first amount of fuel flow for a predetermined time period and a second output of other ones of the plurality of fuel injectors in a second direction that is opposite the first direction by a second amount of fuel flow for the predetermined time period such that a power output of the gas turbine engine is maintained the same as prior to the varying, and determine which of the plurality of temperature measurement devices are impacted by the varying the first output of the individual one of the plurality of fuel injectors in the first direction by determining which of the plurality of temperature measurement devices experiences a change in a gas temperature measurement following the varying, and trim the second output of at least one of the other ones of the plurality of fuel injectors based on the gas temperature measurement from the plurality of temperature measurement devices that are impacted by the varying of the first output of the individual one of the plurality of fuel injectors in the first direction to yield a uniform measured gas temperature as between the plurality of temperature measurement devices.

8. The gas turbine engine of claim 7, wherein the first controller includes a full authority digital engine controller (FADEC).

9. The gas turbine engine of claim 7, wherein the combustor is an annular combustor.

10. The gas turbine engine of claim 7, wherein the first controller is configured to perform the varying of the first output of the individual one of the plurality of fuel injectors in the first direction at the same time as the varying of the second output of the other ones of the plurality of fuel injectors in the second direction such that a total fuel output to the plurality of fuel injectors remains constant during the varying.

11. The gas turbine engine of claim 10, wherein the first controller is configured to perform the varying of the second output of the other ones of the plurality of fuel injectors sequentially in a circumferential direction.

12. The gas turbine engine of claim 7, wherein the first controller is configured for trimming the second output of the at least one of the other ones of the plurality of fuel injectors by operating at least one of the plurality of second controllers under the direction of the first controller.

13. The gas turbine engine of claim 7, wherein the first controller is configured to vary the first output of the individual one of the plurality of fuel injectors in the first direction and the second output of the at least one of the other ones of the plurality of fuel injectors in a second direction, while maintaining a constant thrust output of the gas turbine engine during flight operations in an aircraft.

14. A gas turbine engine, comprising:
a compressor;
a combustor in fluid communication with the compressor;
a plurality of fuel injectors operative to provide fuel for combustion in the combustor;
a turbine in fluid communication with the combustor; and
a controller including a full authority digital engine controller (FADEC) configured for balancing the fuel flow provided from the plurality of fuel injectors, the controller being communicatively coupled to each of a plurality of temperature measurement devices with at least a first communication link and to each of the plurality of fuel injectors with at least a second communication link, the plurality of temperature measurement devices being equal in quantity to the plurality of fuel injectors, each of the plurality of temperature measurement devices being disposed circumferentially between respective circumferentially adjacent pairs of the plurality of fuel injectors,
wherein the controller is configured to:
vary a first output of an individual one of the plurality of fuel injectors in a first direction by a first amount of fuel flow for a predetermined time period and a second output of other ones of the plurality of fuel injectors in a second direction that is opposite the first direction by a second amount of fuel flow for the predetermined time period while maintaining a thrust output of the gas turbine engine;

determine which of the plurality of temperature measurement devices are impacted by the varying the first output of the individual one of the plurality of fuel injectors in the first direction by determining which of the plurality of temperature measurement devices experiences a change in a gas temperature measurement following the varying, and trim the second output of at least one of the plurality of fuel injectors based on the gas temperature measurement from the plurality of temperature measurement devices that are impacted by the varying of the first output of the individual one of the plurality of fuel injectors in the first direction to yield a uniform measured gas temperature as between the plurality of temperature measurement devices.

* * * * *